United States Patent
Stiehl et al.

(10) Patent No.: US 8,265,323 B2
(45) Date of Patent: Sep. 11, 2012

(54) EARPHONE WITH REMOVABLE COMPONENT

(75) Inventors: Kurt Stiehl, San Jose, CA (US); Victor Tiscareno, Issaquah, WA (US); Cameron Frazier, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 959 days.

(21) Appl. No.: 12/205,749

(22) Filed: Sep. 5, 2008

(65) Prior Publication Data

US 2009/0103760 A1    Apr. 23, 2009

Related U.S. Application Data

(60) Provisional application No. 60/999,660, filed on Oct. 19, 2007.

(51) Int. Cl.
 *H04R 1/10* (2006.01)
 *H04R 25/00* (2006.01)
(52) U.S. Cl. .......................... 381/371; 381/380
(58) Field of Classification Search .................. 381/371, 381/374, 325, 322, 380, 328, 327, 309, 23.1
See application file for complete search history.

(56) References Cited

U.S. PATENT DOCUMENTS

| | | | |
|---|---|---|---|
| 2,803,308 A | 8/1957 | Di Mattia | |
| 2,888,921 A | 6/1959 | Nielson et al. | |
| 3,303,902 A | 2/1967 | Knott | |
| 3,710,888 A | 1/1973 | Peart | |
| 3,935,401 A | 1/1976 | Shore et al. | |
| 4,607,720 A | 8/1986 | Hardt | |
| 4,852,684 A | 8/1989 | Packard | |
| 4,879,750 A * | 11/1989 | Nassler | 381/325 |
| 4,880,076 A | 11/1989 | Ahlberg et al. | |
| 4,972,488 A * | 11/1990 | Weiss et al. | 381/325 |
| 5,002,151 A | 3/1991 | Oliveira et al. | |
| 5,288,953 A | 2/1994 | Peart | |
| 5,401,920 A | 3/1995 | Oliveira | |
| 5,449,865 A | 9/1995 | Desnick et al. | |
| 5,824,968 A | 10/1998 | Packard et al. | |
| 5,988,313 A | 11/1999 | Håkansson | |
| 6,129,174 A | 10/2000 | Brown et al. | |
| 6,513,621 B1 | 2/2003 | Deslauriers et al. | |
| 6,671,381 B1 * | 12/2003 | Lux-Wellenhof | 381/325 |
| 6,860,362 B2 | 3/2005 | Saltykov | |
| 6,938,622 B2 | 9/2005 | Huang | |
| 7,349,550 B2 * | 3/2008 | Oliveira et al. | 381/380 |
| 7,464,786 B2 | 12/2008 | Falco et al. | |
| 7,548,629 B1 | 6/2009 | Griffin | |

(Continued)

OTHER PUBLICATIONS

Office Action for U.S. Appl. No. 12/124,471 dated Dec. 22, 2009.

(Continued)

*Primary Examiner* — Yuwen Pan
*Assistant Examiner* — Phan Le

(57) ABSTRACT

An earphone or a removable component for use with an earphone are disclosed. As an example, the removable component can be a cap, filter or cover. According to one aspect, a headphone can provide improved approaches to substantially prevent foreign matter from hindering performance. However, when foreign matter has nevertheless accumulated, a user of the headphone can themselves clean the accumulated foreign matter without any tools or professional assistance. In one embodiment, a cover or filter is position and removably secured proximate to an entry to an acoustic channel of the headphone so that the foreign matter can be substantially blocked from ever entering the acoustic channel. In one embodiment, the cover or filter can be provided as part of a removable structure, e.g., cap, so that the cover or filter can be cleaned, replaced or otherwise serviced.

21 Claims, 14 Drawing Sheets

U.S. PATENT DOCUMENTS

| | | | |
|---|---|---|---|
| 7,627,131 B2 | 12/2009 | Nielsen et al. | |
| 2002/0085728 A1* | 7/2002 | Shennib et al. | 381/328 |
| 2003/0051939 A1 | 3/2003 | Werblud | |
| 2004/0062412 A1* | 4/2004 | Nassimi | 381/380 |
| 2005/0094835 A1 | 5/2005 | Doty | |
| 2006/0147071 A1* | 7/2006 | Neilson | 381/325 |
| 2006/0171549 A1 | 8/2006 | Holmes | |
| 2006/0180387 A1 | 8/2006 | Elliott | |
| 2006/0233411 A1 | 10/2006 | Utigard | |
| 2007/0189570 A1 | 8/2007 | Matsuo et al. | |
| 2007/0201717 A1 | 8/2007 | Dyer et al. | |
| 2007/0221232 A1 | 9/2007 | Jenkins | |
| 2007/0284182 A1 | 12/2007 | Mu | |
| 2008/0013767 A1 | 1/2008 | Olsen et al. | |
| 2008/0031481 A1* | 2/2008 | Warren et al. | 381/322 |
| 2008/0187159 A1* | 8/2008 | Blanchard | 381/328 |
| 2008/0187161 A1 | 8/2008 | Tiemens et al. | |
| 2008/0205679 A1 | 8/2008 | Darbut et al. | |
| 2008/0240485 A1 | 10/2008 | Dyer et al. | |
| 2008/0240486 A1 | 10/2008 | Garcia et al. | |
| 2009/0052711 A1 | 2/2009 | Murozaki | |
| 2009/0101433 A1 | 4/2009 | Stiehl et al. | |
| 2009/0103764 A1 | 4/2009 | Stiehl et al. | |
| 2009/0136074 A1 | 5/2009 | Chang et al. | |
| 2009/0233652 A1 | 9/2009 | Yang | |
| 2009/0304220 A1 | 12/2009 | Fujikura et al. | |
| 2010/0246879 A1 | 9/2010 | Siahaan et al. | |

OTHER PUBLICATIONS

Office Action for U.S. Appl. No. 12/124,471 dated Jul. 22, 2010.
Office Action for U.S. Appl. No. 12/205,748, mailed Aug. 31, 2011.
Final Office Action for U.S. Appl. No. 12/205,748, mailed Feb. 2, 2012.
Office Action for U.S. Appl. No. 12/124,471, mailed Dec. 10, 2010.
Final Office Action for U.S. Appl. No. 12/124,471, mailed Aug. 2, 2011.
Office Action for U.S. Appl. No. 12/124,471, mailed Feb. 28, 2012.
Notice of Allowance for U.S. Appl. No. 12/205,748, mailed May 1, 2012.
Notice of Allowance for U.S. Appl. No. 12/794,690, mailed May 25, 2012.

* cited by examiner

EARPHONE WITH REMOVABLE COMPONENT

CROSS-REFERENCE TO RELATED APPLICATIONS

This application claims priority to U.S. Provisional Patent Application No. 60/999,660, filed Oct. 19, 2007, entitled "INVERTIBLE EAR TIPS FOR AN EARBUD", which is herein incorporated herein by reference.

This application also references: (i) U.S. patent application Ser. No. 12/124,471, filed May 21, 2008, entitled "INVERTIBLE EAR TIPS FOR AN EAR PIECE", which is hereby incorporated herein by reference; and (ii) U.S. patent application Ser. No. 12/205,748, filed Sep. 5, 2008, entitled "REMOVABLE EAR TIP FOR EARPHONE", which is hereby incorporated herein by reference.

BACKGROUND OF THE INVENTION

Several different approaches can be used to provide audio from an electronic device to a user. For example, the electronic device may include or be coupled to a speaker or speaker system operative to provide audio. As another example, the electronic device may be coupled to a headset or headphone for providing audio directly to the user's ears. A headset or headphone (or earphone) is a device that converts electric signals, such as from an electronic device, to audible sound and fits over or in a user's ear. Headphones come in various types and configurations. One type of headset or headphone is over-the-ear, and another type of headset or headphone is in-ear.

To improve a user's comfort, a headset or headphone may include one or more elements operative to provide a pleasant interface between the audio components of the headset (e.g., the ear piece) and the user's ears. For example, some headsets or headphones may include an over-the-ear type ear piece that is operative to be placed on or over the user's ear. The ear piece may include one or more foam or cloth components that provide a compliant fit against the user's ear. As another example, some headsets or headphones may include an in-the-ear type ear piece (e.g., an ear bud) operative to fit inside the user's ear.

In ear headsets or headphones offer superior audio performance. Unfortunately, however, in-ear headsets or headphones have difficultly providing a proper fit with a user's ear while also being comfortable while being worn. Furthermore, in-ear headsets or headphones can suffer from performance degradation due to debris (such as ear wax) accumulating on or in the in-ear headsets or headphones.

SUMMARY OF THE INVENTION

The invention pertains to an earphone or a removable component for use with an earphone. As an example, the removable component can be a cap, filter or cover. As another example, the removable component can be an ear tip.

According to one aspect, the invention can pertain to a headphone that substantially prevents foreign matter from hindering performance. However, when foreign matter has nevertheless accumulated, a user of the headphone can themselves clean the accumulated foreign matter without any tools or professional assistance. In one embodiment, a cover or filter is positioned and removably secured proximate to an entry to an acoustic channel of the headphone so that the foreign matter can be substantially blocked from ever entering the acoustic channel. In one embodiment, the cover or filter can be provided as part of a removable structure, e.g., cap, so that the cover or filter can be cleaned, replaced or otherwise serviced.

The invention may be implemented in numerous ways, including, but not limited to, as a system, device, apparatus, or method. Exemplary embodiments of the invention are discussed below.

As an earphone, one embodiment of the invention can, for example, include at least: an earphone housing having an acoustic channel opening to an acoustic channel; and a removable cap configured to attach to the earphone housing proximate to the acoustic channel opening. The removable cap can have an outer mesh cover. The outer mesh cover can cover the acoustic channel opening while the removable cap is attached to the earphone housing.

As a headphone, one embodiment of the invention can, for example, include at least: a headphone body having an acoustic channel and an acoustic channel opening to the acoustic channel; and a removable cap having a cover, the removable cap being configured to attach to the headphone body adjacent and/or within the acoustic channel opening so that the cover serves to substantially block unwanted debris from entering the acoustic channel while the removable cap is attached to the headphone body.

As a headphone, another embodiment of the invention can, for example, include at least: a headphone body having an acoustic channel and an acoustic channel opening to the acoustic channel; and a removable insert configured to attach to the headphone body proximate to the acoustic channel opening so as to substantially block unwanted debris from entering the acoustic channel while the removable insert is attached to the headphone body. During operation, sound can emit from the acoustic channel, even while the removable insert is attached, without substantial interference due to the removable insert.

Various aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, in which.

DETAILED DESCRIPTION OF THE INVENTION

The invention pertains to an earphone or a removable component for use with an earphone. As an example, the removable component can be a cap, filter or cover. As another example, the removable component can be an ear tip.

According to one aspect, the invention can pertain to a headphone that substantially prevents foreign matter from hindering performance. However, when foreign matter has nevertheless accumulated, a user of the headphone can themselves clean the accumulated foreign matter without any tools or professional assistance. In one embodiment, a cover or filter is positioned and removably secured proximate to an entry to an acoustic channel of the headphone so that the foreign matter can be substantially blocked from ever entering the acoustic channel. In one embodiment, the cover or filter can be provided as part of a removable structure, e.g., cap, so that the cover or filter can be cleaned, replaced or otherwise serviced.

Exemplary embodiments of aspects of the present invention are discussed below with reference to the various figures. However, those skilled in the art will readily appreciate that the detailed description given herein with respect to these figures is for explanatory purposes, as the invention extends beyond these embodiments. It should be noted that the embodiments are in many cases are not depicted in an actual or consistent scale. For example, embodiment are often depicted larger than actual product size for ease of illustration.

Figure 1A:
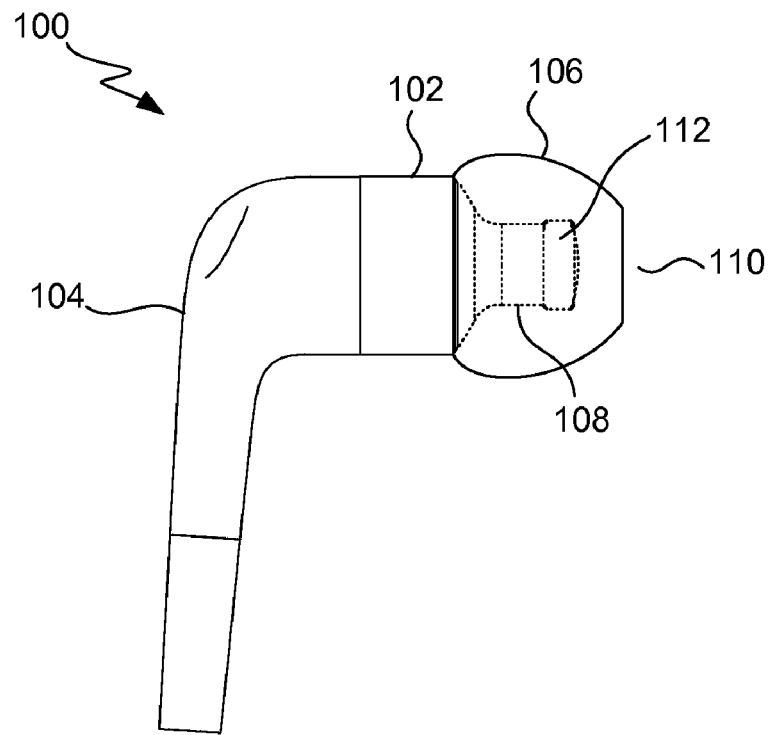
FIGS. 1A-1B are diagrams illustrating a headphone according to one embodiment of the invention.
Figure 1B:
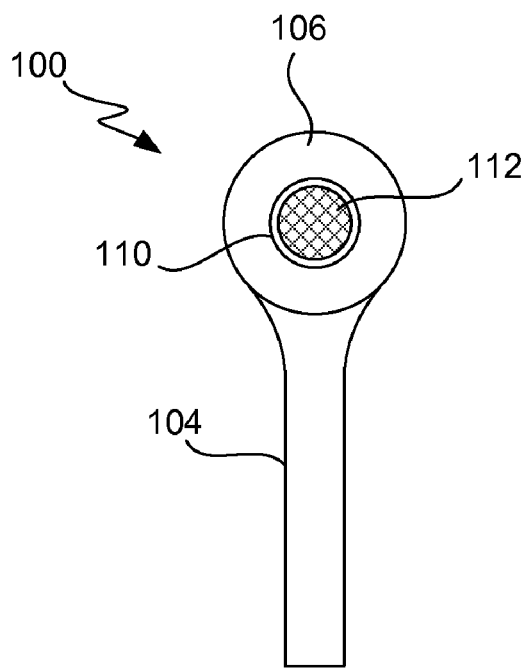

FIGS. 1A-1B are diagrams illustrating a headphone 100 according to one embodiment of the invention. FIG. 1A is a side view of the headphone 100, and FIG. 1B is a front view of the headphone 100. The headphone 100 can also be referred to as an earphone.

The headphone 100 includes a front body 102 and a rear body 104. The front body 102 is attached to the rear body 104. Alternatively, the front body 102 and rear body 104 can be formed as a unitary structure. The headphone 100 can also include an ear tip 106. The ear tip 106 is a deformable structure capable of conforming to a user's ear when being used by a user. The ear tip 106 can attach to a protruding portion 108 on the front body 102. Still further, as illustrated in FIG. 1B, the ear tip 106 can include an opening 110. The opening 110 exposes a cover 112 provided on a top end of the protruding portion 108 of the front body 102. As one example, the cover 112 can be a mesh cover, such as a screen (e.g., stainless steel screen). The top end of the protruding body 108 is adjacent the opening 110 in the ear tip 106. To provide audio sound for the user, the headphone 100 provides an acoustic channel internal to the front body 102. For proper output of quality audio sound from the headphone 100, the acoustic channel needs to remain substantially free from foreign matter that may collect in the acoustic channel. By providing the cover 112 at the top end of the protruding body 108, the cover 112 can serve to substantially prevent foreign matter, such as human debris (e.g., ear wax), from entering into the acoustic channel.

Figure 2A:
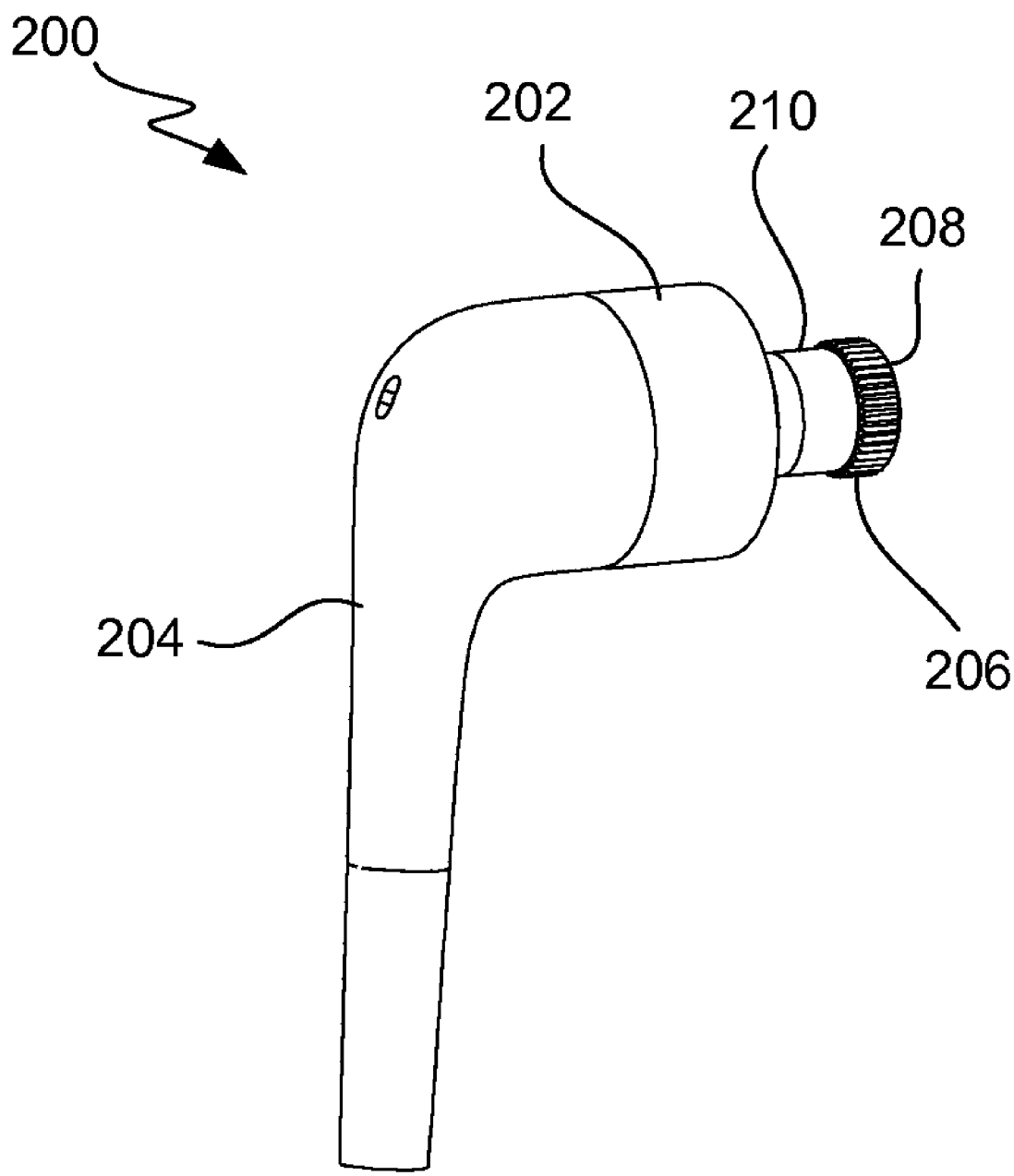
FIGS. 2A-2C are diagrams illustrating a headphone according to one embodiment of the invention.
Figure 2B:
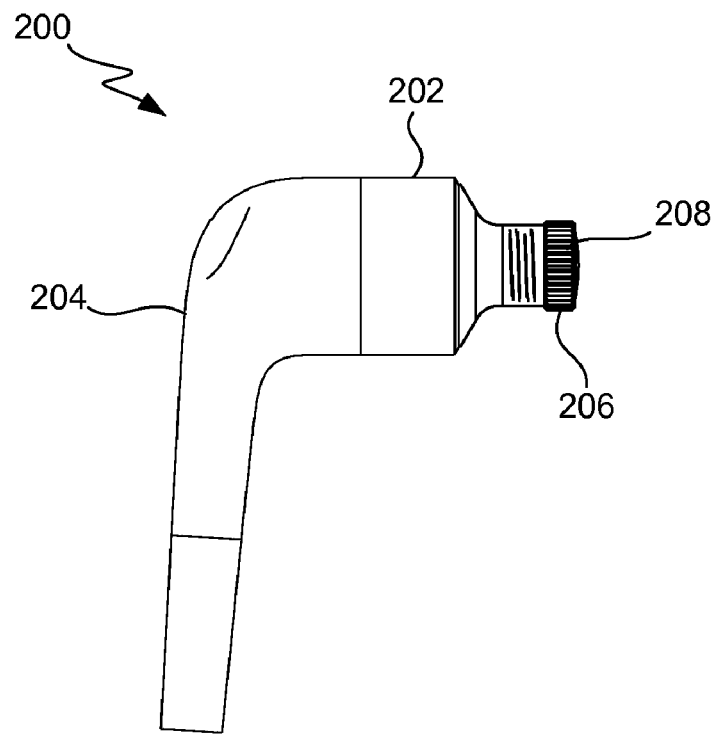
Figure 2C:
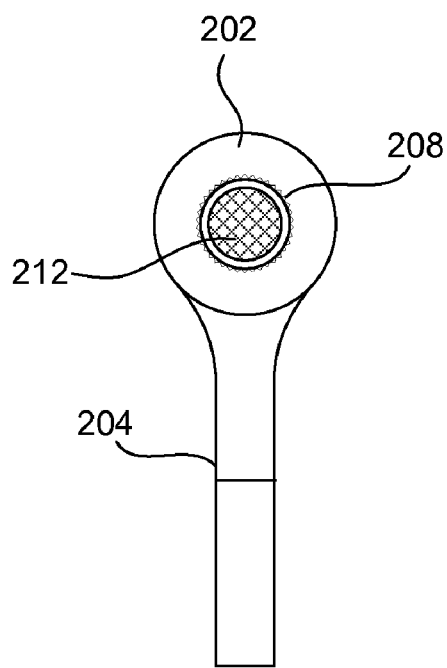

FIGS. 2A-2C are diagrams illustrating a headphone 200 according to one embodiment of the invention. FIG. 2A is a perspective view of the headphone 200, FIG. 2B is a side view of the headphone 200, and FIG. 2C is a front view of the headphone 200. The headphone 200 includes a front body 202 and a rear body 204. In the front body 202 and the rear body 204 can be separately formed parts that can be assembled together to form a housing for the headphone 200. In one implementation, the front body 202 is secured to the rear body 204 by mechanical features, such as notches, detents, recesses, threads, or adhesives. In another implementation, the front body 202 and the rear body 204 can be formed as a unitary structure.

The front body 202 includes a removable cap 206. The removable cap 206 can include a plurality of the knurls 208. In this embodiment, it is intended that the removable cap 206 be removable from the headphone 200 by a user. Hence, the knurls 208, if provided, can assist the user with removal of the removable cap 206 from the headphone 200 or attachment of the removable cap 206 to the headphone 200. As shown in FIGS. 2A and 2B, the removable cap 206 can be removably attached to a top end of a protruding portion 210 of the front body 210.

The front body 202 encloses an acoustic channel that is used to provide sound to a user of the headphone 200. As such, acoustic channel extends through the center of the front body 202. Further, the removable cap 206 includes a central opening so that the sound being provided via the acoustic channel can emit from the headphone 200. As shown in FIG. 2C, the headphone 200 can also include a mesh cover 212 provided on or within the removable cap 206. Advantageously, the mesh cover 212 is placed at the end of the acoustic channel with respect to the front body 202. The mesh cover 212 is thereby able to substantially prevent foreign matter, such as human debris, from entering into the acoustic channel. If significant foreign matter is able to enter the acoustic channel, the acoustical characteristics and the ability for the headphone 200 to properly output sound to its user can be substantially hindered. Hence, the mesh cover 212 serves to substantially block foreign matter from entering the acoustic channel. If the mesh cover 212 becomes clogged, the removable cap 206 can be removed from the front body 202 and the mesh cover 212 can be services (e.g., cleaned to remove accumulated foreign debris).

The front body 202, the rear body 204, the removable cap 206 and the mesh cover 212 can be formed of the same or different materials (e.g., plastic, ceramic, metals, nylon, etc.). In one implementation, the rear body 204 can be plastic, and the front body 202, the removable cap 206 and the mesh cover 212 can be metal (e.g., stainless steel).

Figure 3:
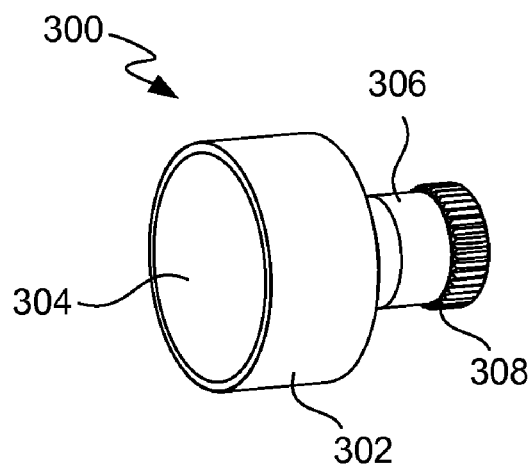
FIG. 3 is a perspective view of a front body according to one embodiment of the invention.

FIG. 3 is a perspective view of the front body 300 according to one embodiment of the invention. The front body 300 is, for example, suitable for use as the front body 202 illustrated in FIGS. 2A-2C.

The front body 300 includes a base portion 302 and an output portion 306. The base portion 302 can be integrally formed with the output portion 306. Alternatively, the base portion 302 and the output portion 306 can be separate parts that are assembled together to form the front body 300. At a bottom end of the base portion 302 includes an opening 304. The opening 304 allows the front body 300 to be attached to a rear body, such as the rear body 104 illustrated in FIGS. 1A and 1B or the rear body 204 illustrated in the FIGS. 2A-2C. In addition, the front body 300 can include a removable cap 308. The removable cap 308 can attach to the output portion 306. As shown in FIG. 3, the removable cap 308 is able to be attached to a top end of the output portion 306.

Figure 4:
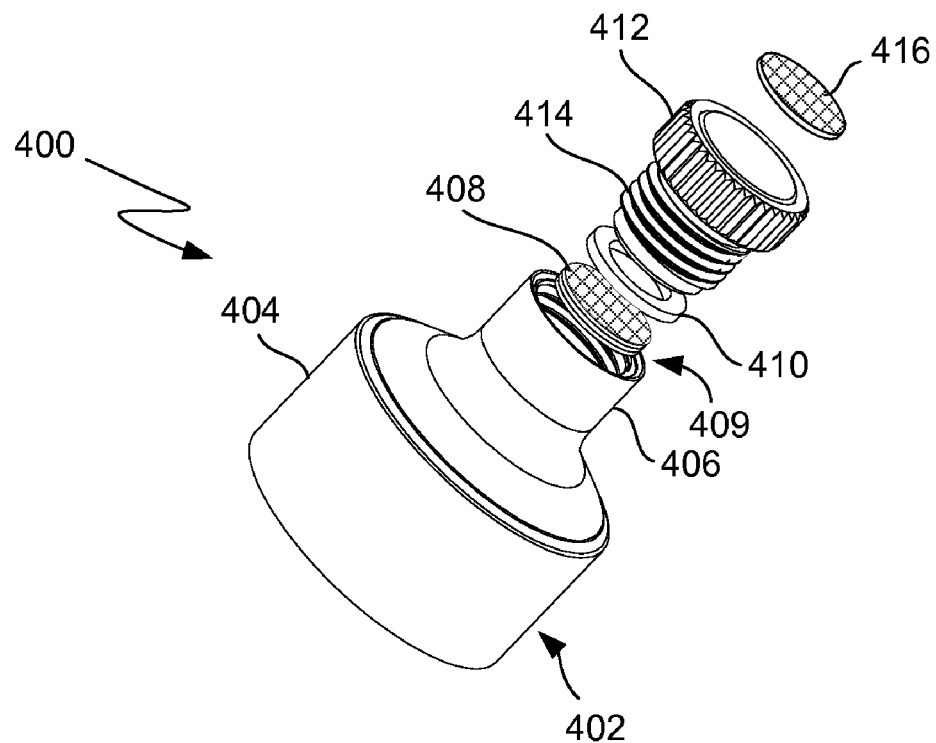
FIG. 4 is a perspective assembly diagram for a front body assembly according to one embodiment of the invention.

FIG. 4 is a perspective assembly diagram for a front body assembly 400 according to one embodiment of the invention. The front body assembly 400, once assembled, can pertain to the front body 300 illustrated in FIG. 3.

The front body assembly 400 includes a front body 402. The front body 402 includes a base portion 404 and an output portion 406. The output portion 406 can correspond to a protruding portion of the front body 402. As illustrated in FIG. 4, at the end of the protruding portion of the output portion 406, various components can be inserted in or attached to the output portion 406. Specifically, as shown in FIG. 4, an internal mesh 408 can be placed internal to an opening 409 of the output portion 406. In addition, an internal gasket 410 can be placed within the opening 409 of the output portion 406. The output portion 406 can also receive a cap body 412. In one embodiment, the cap body 412 includes threads 414. The opening 409 in the output portion 406 can also include threads. In such case, the cap body 412 can be screwed into the opening 409 in the output portion 406. When the cap body is screwed into the opening 409 in the output portion 406, the internal gasket 410 can serve to further secure the cap body 412 within the opening 409 of the output portion 406. The internal gasket 410 can provide a compliant surface that can be compressed when the cap body 412 is screwed completely into the opening in the output portion 406. The internal mesh 408 can be secured within the opening 409 in the output portion 406 by adhesive and/or by the internal gasket 410. The internal gasket 410 can be sized such that even with the cap body 412 removed from the opening 409 in the output portion 406, the internal mesh 408 remains secured in the opening 409. However, should the internal mesh 408 need to be removed, the internal gasket 410 is conformable such that it can be removed from the opening 409 thereby allowing the internal mesh 408 to also be removed for servicing. The front body assembly 400 can also includes an outer mesh 416. The outer mesh 416 can be secured to a top surface of the cap body 412.

Although the internal mesh 408 and the outer match 416 are utilized, the acoustic channel provided through the opening 409 in the output portion 406 is not blocked by any of the components of the front body assembly 400 being inserted or coupled to the output portion 406. In this regard, the internal gasket 410 is ring-shaped, and the cap body 412 is hollow or tubular. Further, the internal mesh 408 and the outer mesh 416 include numerous openings within the mesh structures that allow sound from the acoustic channel to properly emit from the front body assembly 400. In other words, the internal mesh 408 and the outer mesh 416 are substantially acoustically neutral.

The parts of the front body assembly 400 can be formed of different materials (e.g., plastic, ceramic, metals, nylon, etc.). In one implementation, the front body 402 can be metal, the internal mesh 408 can be metal, the internal gasket 410 can be rubber, the cap body 412 can be metal, and the outer mesh 416 can be metal. As one example, the metal can be stainless steel.

Figure 5:
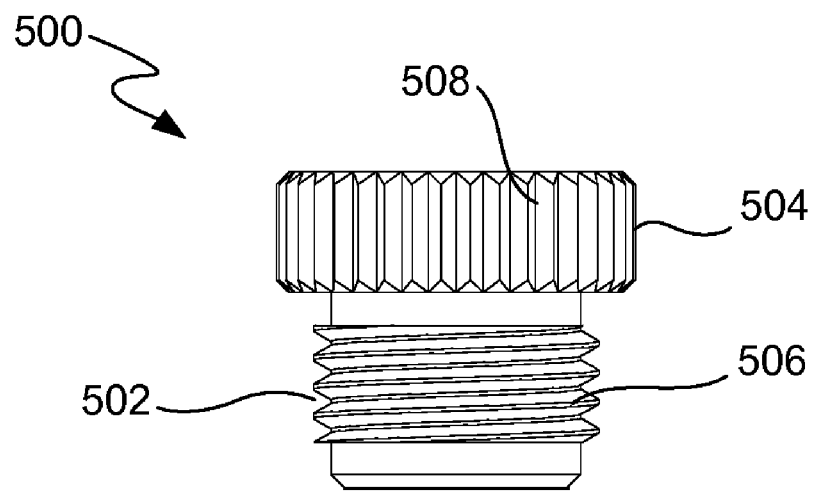
FIG. 5 is a side view of a cap body according to one embodiment of the invention.

FIG. 5 is a side view of a cap body 500 according to one embodiment of the invention. The cap body 500 includes a bottom portion 502 and a top portion 504. In the bottom portion 502 includes threads 506. The top portion 504 includes knurls 508.

Figure 6:
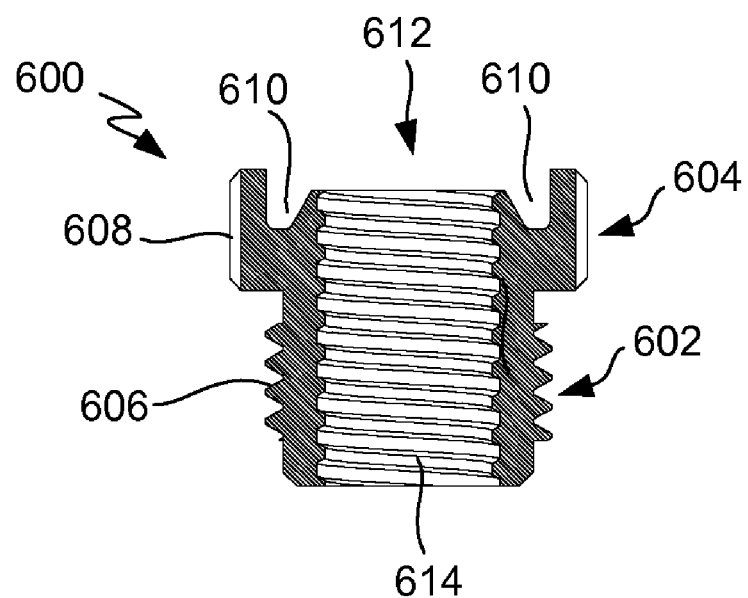
FIG. 6 is a cross-sectional view of a cap body according to one embodiment of the invention.

FIG. 6 is a cross-sectional view of a cap body 600 according to one embodiment of the invention. The cap body 600 includes a bottom portion 602 and a top portion 604. The bottom portion 602 has external threads 606. The top portion 604 includes knurls 608 about the periphery of the top portion 604. In addition, the cap body 600 includes a recess region 610 for receiving a cover, such as a mesh cover. Additionally, the cap body 600 has an opening 612 that extends therethrough. The opening 612 couples to, extends or is part of the acoustic channel for a front body (e.g., cap body 402) to which the cap body 600 is attached. The opening 612 internal to the cap body 600 can further include internal threads 614. The internal threads 614 do not serve a mechanical purpose but have been shown to have beneficial acoustic impact on acoustical characteristics of the acoustic channel.

Figure 7:
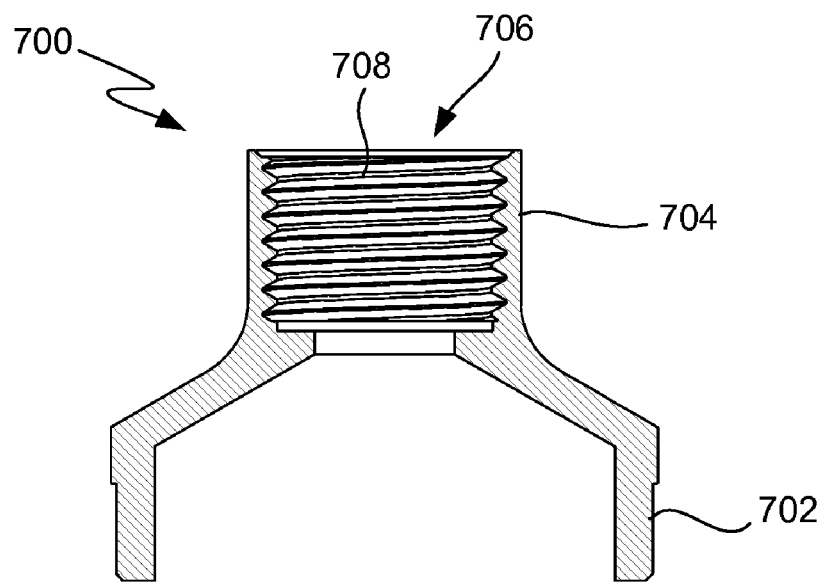
FIG. 7 is a cross-sectional view of an output portion of a front body according to one embodiment of the invention.

FIG. 7 is a cross-sectional view of an output portion 700 of a front body according to one embodiment of the invention. The output portion 700 includes a tapered structure 702 and an output structure 704. A central portion of the output portion 700 extends an opening 706 which provides an acoustic channel through the output portion 700. Internal to the output structure 704 are threads 708 for receiving compatible threads of a removable cap (e.g., cap body 412, 500, 600). Although the output portion 700 utilizes threads 708 to secure a removable camp to the output portion 700, it should be recognized that in other embodiments different techniques can be utilized to secure a removable cap to the output portion 700.

Figure 8:
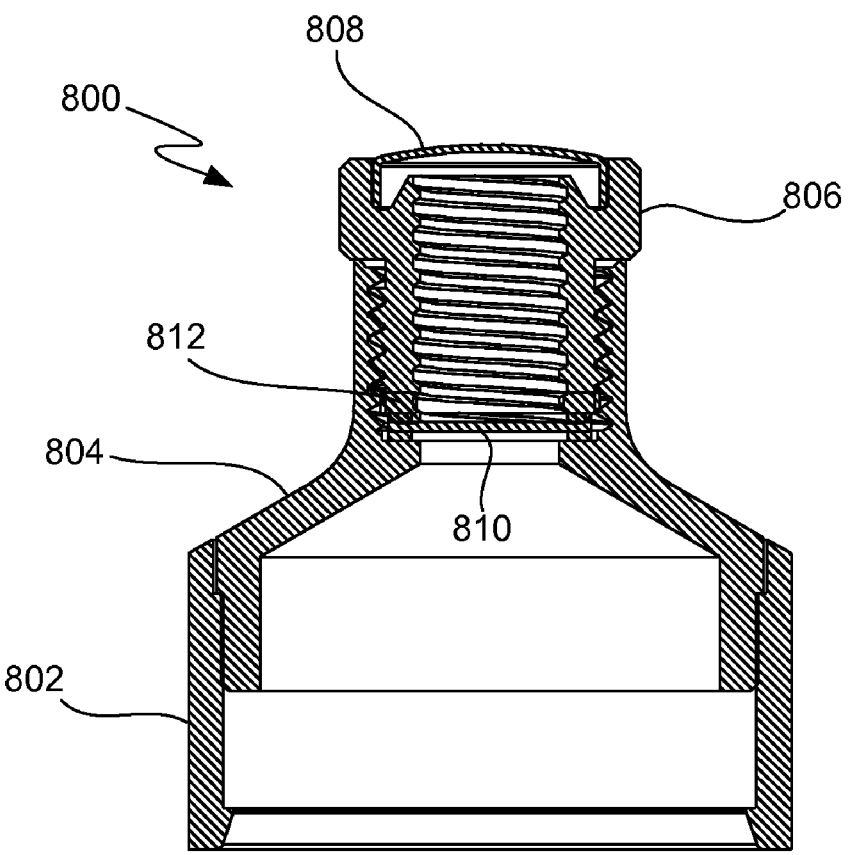
FIG. 8 is a cross-sectional view of a front body according to one embodiment of the invention.

FIG. 8 is a cross-sectional view of a front body 800 according to one embodiment of the invention. As illustrated in FIG. 8, the front body 800 is fully assembled. Initially, it is noted that the front body 800 includes a base portion 802. The base portion 802 serves to connect to a rear body of a headphone (e.g., rear body 104, 204). The front body 800 also includes an output portion 804. The output portion 804 is, for example, constructed as is the output portion 700 illustrated in FIG. 7. Additionally, a removable cap 806 has been attached to the output portion 804. In particular, the removable 806 has been screwed into the threaded opening in a top end of the output portion 804. The removable cap 806 can have an outer mesh 808 secured to a top end of the removable cap 806. The outer mesh 808 can be secured to the top end of the removable cap 806 by interference (frictional) fitting, adhesive, notches, protrusions, and the like. Additionally, an internal mesh 810 and a gasket 812 can be provided within the threaded opening of the output portion 804. As illustrated in FIG. 8, the gasket 812 can be provided in the opening of the output portion 804 between the internal mesh 810 and a forward end of the removable cap 806 while inserted. When the removable cap 806 is screwed into the threaded opening of the output portion 804, the gasket 812 can be compressed, which thereby serves to prevent the removable cap 806 from loosening. Hence, the gasket 812 can be considered as a retention device for the removable cap 806.

According to another aspect, the invention can pertain to an ear tip for use with a headphone. The ear tip can include a deformable outer member and is suitable for in-ear operation. The deformable outer member enables the ear tip to readily conform to a user's ear. The ear tip can also include an inner member to structurally support the outer member and to facilitate attachment to a headphone.

The ear tip can, for example, be used with the headphones discussed above. For example, the ear tip can be removably attached to a headphone such as illustrated in FIG. 1A. In one embodiment, the ear tips are soft and deformable. The ear tips can be used in-ear. Since the ear tips can readily deform, the ear tips can operate to substantially seal against a user's ear. For increased comfort, the ear tips can be provided in different sizes to accommodate variation in user ear sizes. The color and translucency of the ear tips can also vary.

In one embodiment, the ear tip can be formed from an elastomer, which is a polymer with the property of elasticity. For example, the ear tip can be formed, in whole or in part, of silicone or silicone rubber.

Figure 9A:
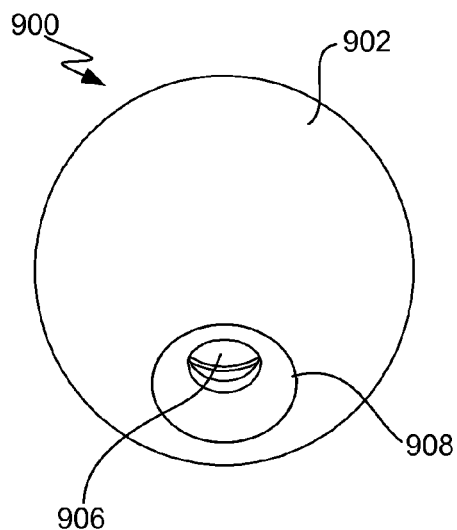
FIGS. 9A-9E are views of an ear tip according to one embodiment of the invention.
Figure 9B:
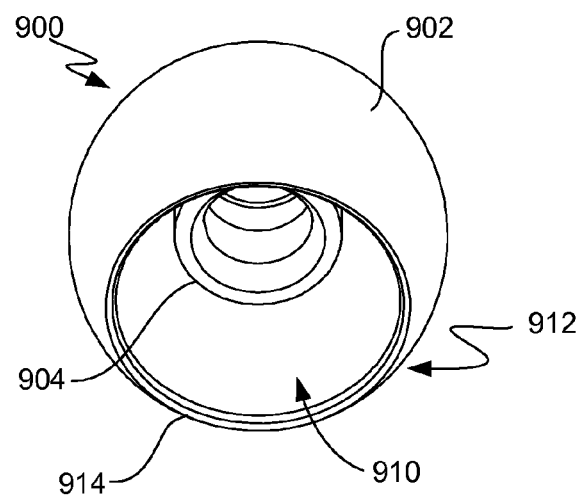
Figure 9C:
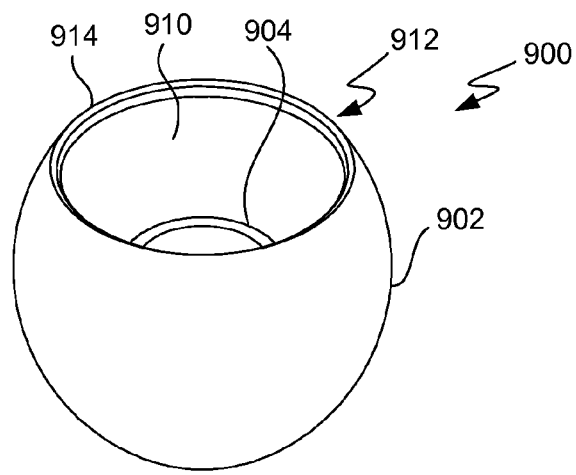

FIGS. 9A-9E are views of an ear tip 900 according to one embodiment of the invention. FIG. 9A is a front perspective view of the ear tip 900, FIG. 9B is a rear perspective view of the ear tip 900, and FIG. 9C is a side perspective view of the ear tip 900.

The ear tip 900 includes an outer structure 902 and an inner structure 904. The ear tip 900 also has a top opening 906 provided at a front surface 908 of the ear tip 900. The top opening 906 serves as an opening for audio sound (emitted from a headphone) to be directed into a user's ear canal. The ear phone 900 also has a bottom opening 910 at a rear surface 912. At the rear surface 912, a bottom edge 914 is provided around the bottom opening 910.

The inner structure 904 is covered by the outer structure 902. The outer structure 902 is adhered to or integral with the inner structure 904 at the front surface 908. The outer structure 902 extends over and around the inner structure 902 but remains open at the bottom opening 910 at the rear surface 912. Behind the front surface 908, the outer structure 902 is spaced apart from the inner structure 904. The separation between the outer structure 902 and the inner structure 904 can be filled with air. Hence, the separation with air can be referred to as an air interface. The separation between the outer structure 902 and the inner structure 904 allows the outer structure to be readily deformed. For example, in use, the ear tip 900 will be inserted into or adjacent a user's ear canal and the outer structure 902 can readily deform to substantially seal against a user's ear.

Figure 9D:
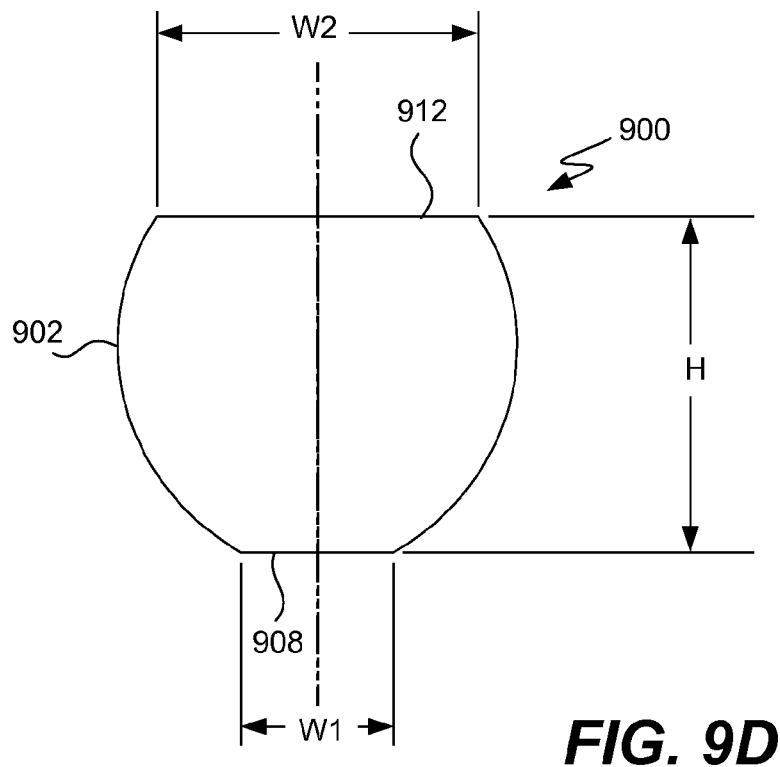

FIG. 9D is a side view of the ear tip 900 according to one embodiment of the invention. The configuration of the outer structure 902 according to one embodiment of the invention is illustrated in FIG. 9D. According to the embodiment illustrated in FIG. 9D, the ear tip 900 can have a height (H) of 10.48 mm, the width (W1) (diameter) of the front surface 908 can be 4.75 mm, the width (W2) (diameter) of the rear surface 912 can be 10.01 mm.

Figure 9E:
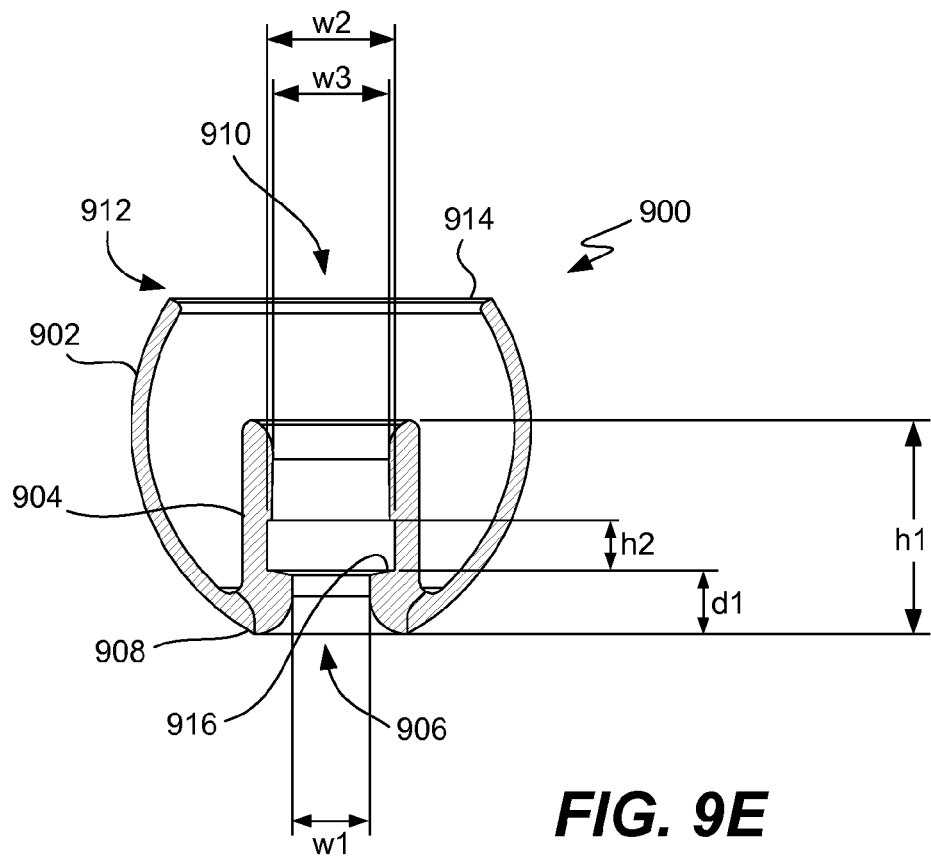

FIG. 9E is a cross-sectional view of the ear tip 900 according to one embodiment of the invention. The configuration of the inner structure 904 according to one embodiment of the invention is illustrated in FIG. 9E. The inner structure 904 can be cylindrical, so as to have a tubular configuration. The top of the inner structure 904 adheres to or is integral with the top region of the outer structure 902 at the front surface 908. Additionally, the internal configuration of the inner structure 904 can include one or more attachment features 916 that facilitates attachment of the inner structure 904 of the ear tip to a headphone. For example, the internal configuration of the inner structure 904 includes at least one recess that can serve as an attachment feature 916. According to the embodiment illustrated in FIG. 9E, the inner structure 904 can have a total height (h1) of 6.66 mm, a distance d1 from the front surface 908 to the start of the attachment feature 916 is 2.00 mm, the height (h2) of the attachment feature 916 (recess) is 1.55 mm, the width (w1) (diameter) of the top opening 906 is 2.40 mm, the width (w2) at the attachment feature 916 is 3.99 mm, and the width (w3) at the lower portion of the inner structure 904 is 3.61 mm.

In one embodiment, the hardness of the inner structure 904 and the outer structure 902 are configured differently. For example, the inner structure 904 can have a greater hardness that the outer structure 902. In other words, in such an example, the outer structure 902 can be softer than the inner structure 904.

Durometer is one of several ways to indicate the hardness of a material, defined as the material's resistance to permanent indentation. The term durometer is often used to refer to the measurement, as well as the instrument itself. Durometer is typically used as a measure of hardness in polymers, elastomers and rubbers. In one implementation, according to a durometer measurement, the durometer of the inner structure 904 can be sixty (60), and the durometer of the outer structure 902 can be forty (40).

Figure 10A:
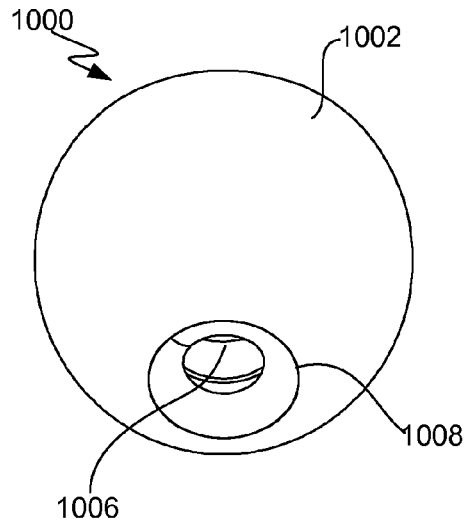
FIGS. 10A-10E are views of an ear tip according to another embodiment of the invention.
Figure 10B:
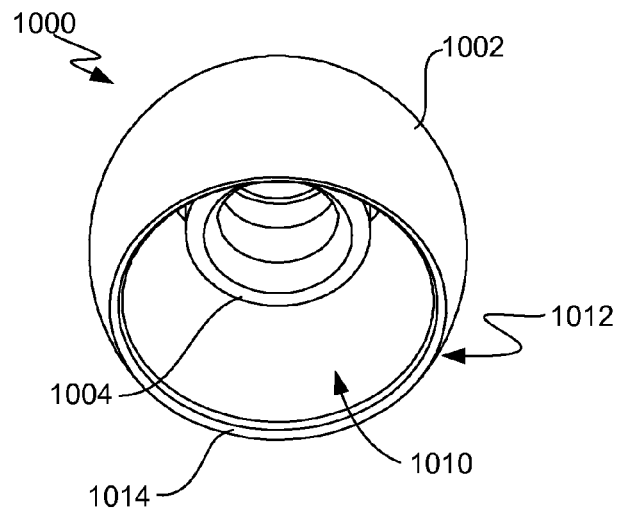
Figure 10C:
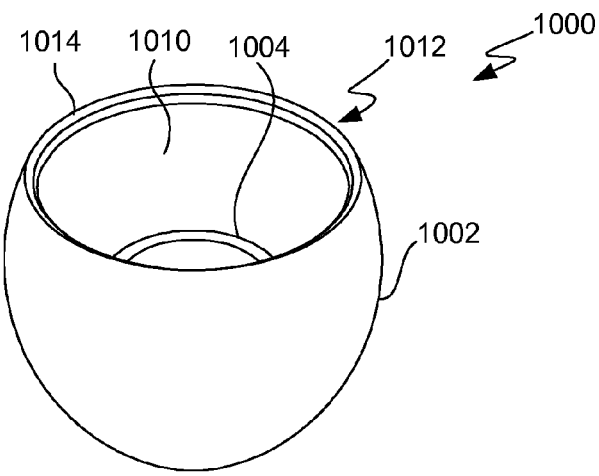

FIGS. 10A-10E are views of an ear tip 1000 according to one embodiment of the invention. FIGS. 10A-10E are views of an ear tip 1000 according to one embodiment of the invention. FIG. 10A is a front perspective view of the ear tip 1000, FIG. 10B is a rear perspective view of the ear tip 1000, and FIG. 10C is a side perspective view of the ear tip 1000. The ear tip 1000 is smaller than the ear tip 900 illustrated in FIGS. 9A-9E.

The ear tip 1000 includes an outer structure 1002 and an inner structure 1004. The ear tip 1000 also has a top opening 1006 provided at a front surface 1008 of the ear tip 1000. The top opening 1006 serves as an opening for audio sound (emitted from a headphone) to be directed into a user's ear canal. The ear phone 1000 also has a bottom opening 1010 at a rear surface 1012. At the rear surface 1012, a bottom edge 1014 is provided around the bottom opening 1010.

The inner structure 1004 is covered by the outer structure 1002. The outer structure 1002 is adhered to or integral with the inner structure 1004 at the front surface 1008. The outer structure 1002 extends over and around the inner structure 1002 but remains open at the bottom opening 1010 at the rear surface 1012. Behind the front surface 1008, the outer structure 1002 is spaced apart from the inner structure 1004. The separation between the outer structure 1002 and the inner structure 1004 can be filled with air. Hence, the separation with air can be referred to as an air interface. The separation between the outer structure 1002 and the inner structure 1004 allows the outer structure to be readily deformed. For example, in use, the ear tip 1000 will be inserted into or adjacent a user's ear canal and the outer structure 1002 can readily deform to substantially seal against a user's ear.

Figure 10D:
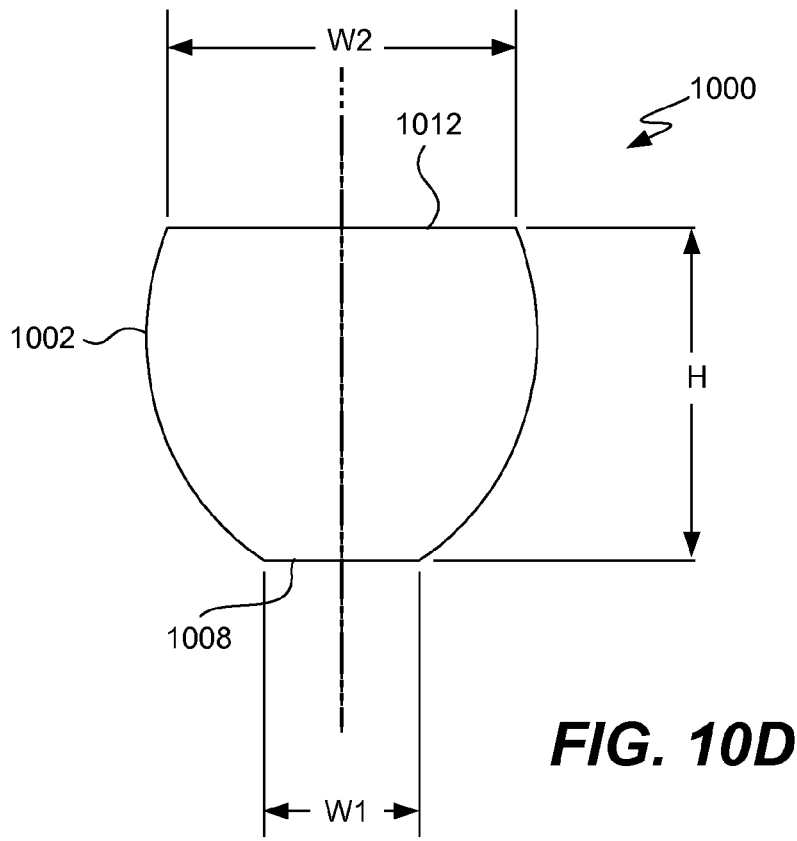

FIG. 10D is a side view of the ear tip 1000 according to one embodiment of the invention. The configuration of the outer structure 1002 according to one embodiment of the invention is illustrated in FIG. 10D. According to the embodiment illustrated in FIG. 10D, the ear tip 1000 can have a height (H) of 9.58 mm, the width (W1) (diameter) of the front surface 1008 can be 4.48 mm, the width (W2) (diameter) of the rear surface 1012 can be 10.01 mm.

Figure 10E:
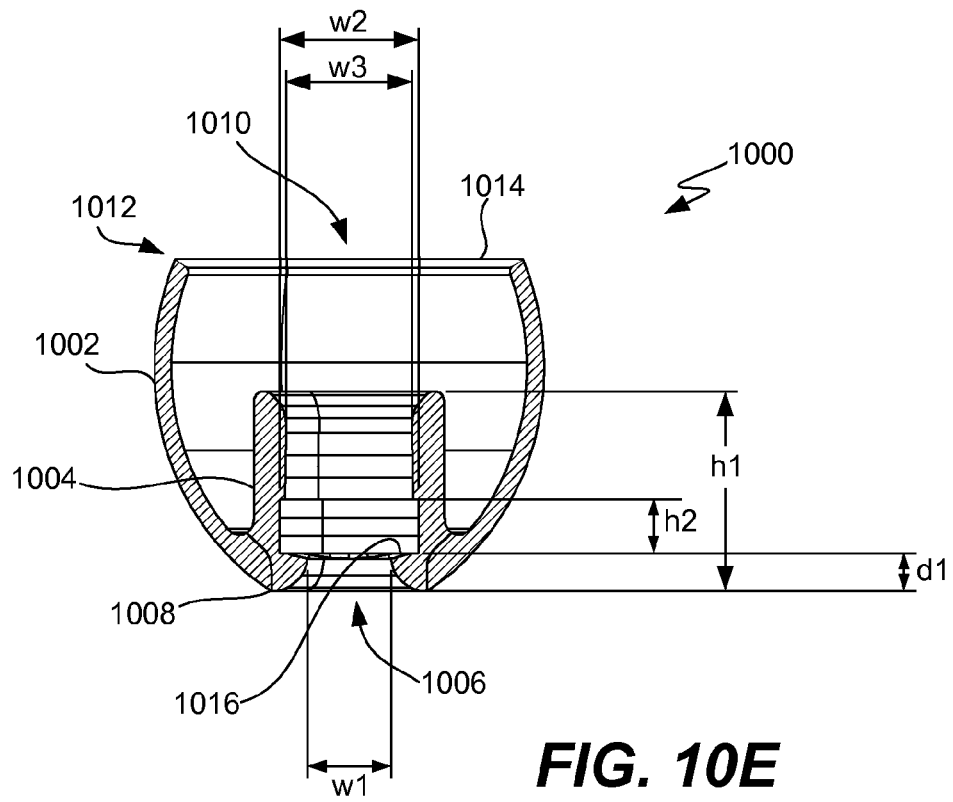

FIG. 10E is a cross-sectional view of the ear tip 1000 according to one embodiment of the invention. The configuration of the inner structure 1004 according to one embodiment of the invention is illustrated in FIG. 10E. The inner structure 1004 can be cylindrical, so as to have a tubular configuration. The top of the inner structure 1004 adheres to or is integral with the top region of the outer structure 1002 at the front surface 1008. Additionally, the internal configuration of the inner structure 1004 can include one or more attachment features 1016 that facilitates attachment of the inner structure 1004 of the ear tip to a headphone. For example, the internal configuration of the inner structure 1004 includes at least one recess that can serve as an attachment feature 1016. According to the embodiment illustrated in FIG. 10E, the inner structure 1004 can have a total height (h1) of 5.76 mm, a distance d1 from the front surface 1008 to the start of the attachment feature 1016 is 1.10 mm, the height (h2) of the attachment feature 1016 (recess) is 1.55 mm, the width (w1) (diameter) of the top opening 1006 is 2.41 mm, the width (w2) at the attachment feature 1016 is 3.99 mm, and the width (w3) at the lower portion of the inner structure 1004 is 3.61 mm.

In one embodiment, the hardness of the inner structure 1004 and the outer structure 1002 are configured differently. For example, the inner structure 1004 can have a greater hardness that the outer structure 1002. In other words, in such an example, the outer structure 1002 can be softer than the inner structure 1004. In one implementation, according to a durometer measurement, the durometer of the inner structure 1004 can be fifty (50), and the durometer of the outer structure 1002 can be thirty (30).

Figure 11A:
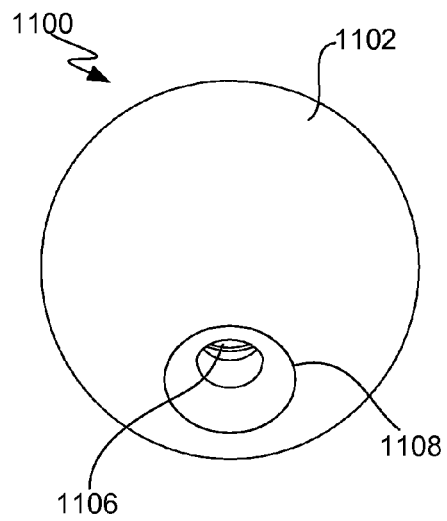
FIGS. 11A-11E are views of an ear tip according to still another embodiment of the invention.
Figure 11B:
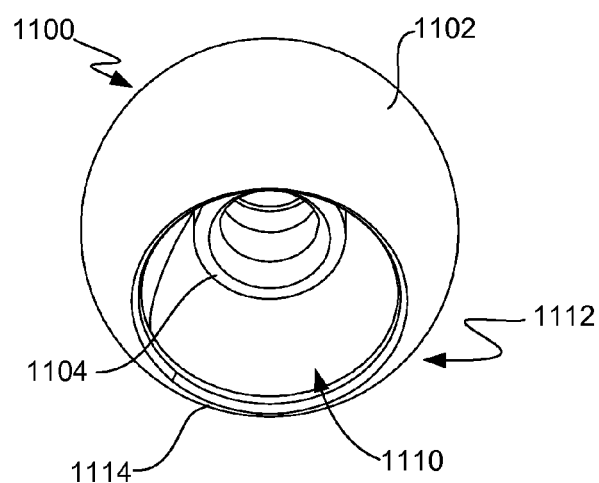
Figure 11C:
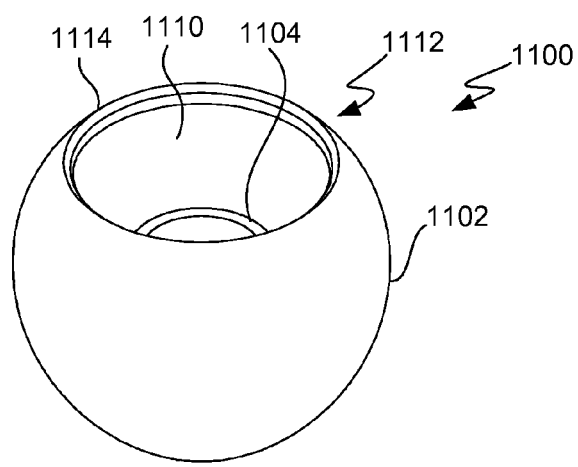

FIGS. 11A-11E are views of an ear tip 1100 according to one embodiment of the invention. FIGS. 11A-11E are views of an ear tip 1100 according to one embodiment of the invention. FIG. 11A is a front perspective view of the ear tip 1100, FIG. 11B is a rear perspective view of the ear tip 1100, and FIG. 11C is a side perspective view of the ear tip 1100. The ear tip 1100 is larger than the ear tip 900 illustrated in FIGS. 9A-9E.

The ear tip 1100 includes an outer structure 1102 and an inner structure 1104. The ear tip 1100 also has a top opening 1106 provided at a front surface 1108 of the ear tip 1100. The top opening 1106 serves as an opening for audio sound (emitted from a headphone) to be directed into a user's ear canal. The ear phone 1100 also has a bottom opening 1110 at a rear surface 1112. At the rear surface 1112, a bottom edge 1114 is provided around the bottom opening 1110.

The inner structure 1104 is covered by the outer structure 1102. The outer structure 1102 is adhered to or integral with the inner structure 1104 at the front surface 1108. The outer structure 1102 extends over and around the inner structure 1102 but remains open at the bottom opening 1110 at the rear surface 1112. Behind the front surface 1108, the outer structure 1102 is spaced apart from the inner structure 1104. The separation between the outer structure 1102 and the inner structure 1104 can be filled with air. Hence, the separation with air can be referred to as an air interface. The separation between the outer structure 1102 and the inner structure 1104 allows the outer structure to be readily deformed. For example, in use, the ear tip 1100 will be inserted into or adjacent a user's ear canal and the outer structure 1102 can readily deform to substantially seal against a user's ear.

Figure 11D:
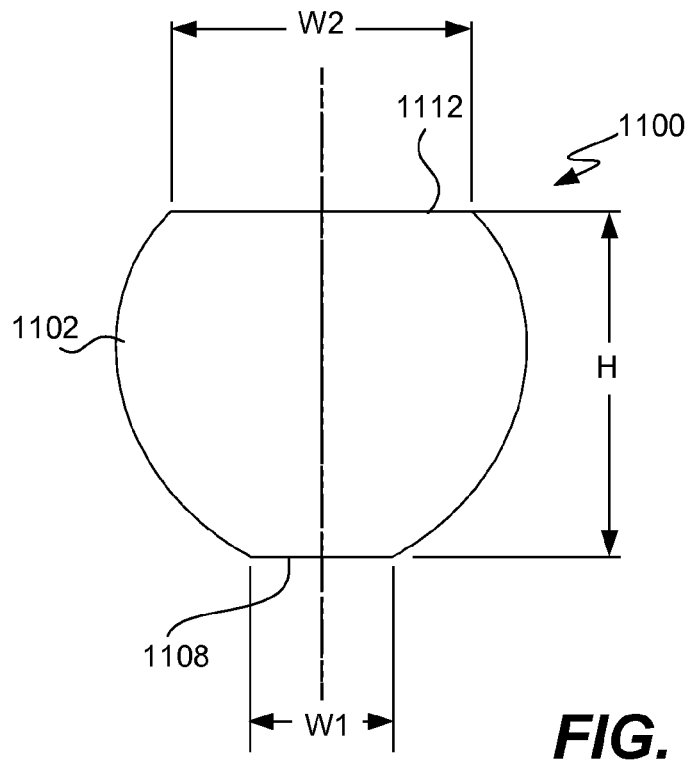

FIG. 11D is a side view of the ear tip 1100 according to one embodiment of the invention. The configuration of the outer structure 1102 according to one embodiment of the invention is illustrated in FIG. 11D. According to the embodiment illustrated in FIG. 11D, the ear tip 1100 can have a height (H) of 11.53 mm, the width (W1) (diameter) of the front surface 1108 can be 4.76 mm, the width (W2) (diameter) of the rear surface 1112 can be 10.01 mm.

Figure 11E:
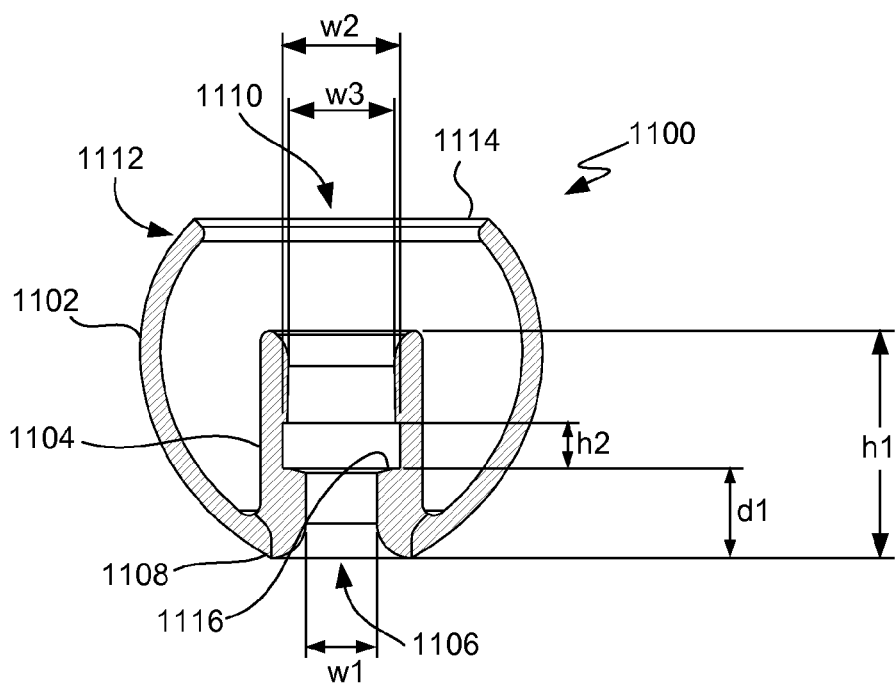

FIG. 11E is a cross-sectional view of the ear tip 1100 according to one embodiment of the invention. The configuration of the inner structure 1104 according to one embodiment of the invention is illustrated in FIG. 11E. The inner structure 1104 can be cylindrical, so as to have a tubular configuration. The top of the inner structure 1104 adheres to or is integral with the top region of the outer structure 1102 at the front surface 1108. Additionally, the internal configuration of the inner structure 1104 can include one or more attachment features 1116 that facilitates attachment of the inner structure 1104 of the ear tip to a headphone. For example, the internal configuration of the inner structure 1104 includes at least one recess that can serve as an attachment feature 1116. According to the embodiment illustrated in FIG. 11E, the inner structure 1104 can have a total height (h1) of 7.71 mm, a distance d1 from the front surface 1108 to the start of the attachment feature 1116 is 3.05 mm, the height (h2) of the attachment feature 1116 (recess) is 1.55 mm, the width (w1) (diameter) of the top opening 1106 is 2.40 mm, the width (w2) at the attachment feature 1116 is 3.99 mm, and the width (w3) at the lower portion of the inner structure 1104 is 3.61 mm.

In one embodiment, the hardness of the inner structure 1104 and the outer structure 1102 are configured differently. For example, the inner structure 1104 can have a greater hardness that the outer structure 1102. In other words, in such an example, the outer structure 1102 can be softer than the inner structure 1104. In one implementation, according to a durometer measurement, the durometer of the inner structure 1104 can be sixty (60), and the durometer of the outer structure 1002 can be forty (40).

Figure 12:
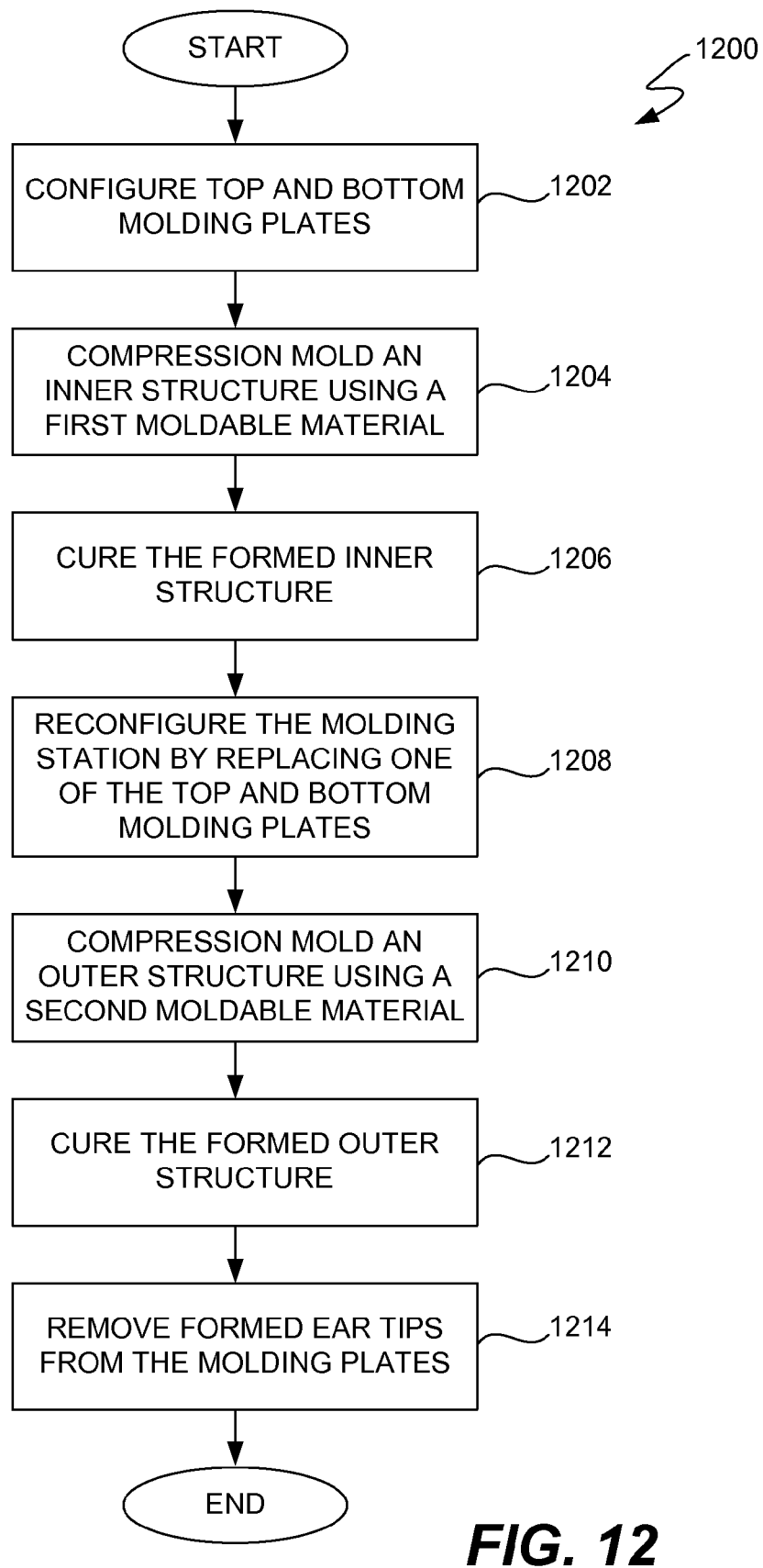
FIG. 12 is a flow diagram of an ear tip formation process according to one embodiment of the invention.

FIG. 12 is a flow diagram of an ear tip formation process 1200 according to one embodiment of the invention. The ear tip formation process 1200 can, for example, be used to form ear tips utilized by headphones. The ear tips being formed can, for example, be the ear tips 900, 1000 or 1100 illustrated in FIGS. 9A-11E.

The ear tip formation process 1200 can initially configure 1202 top and bottom molding plates. The molding plates are associated with a molding station (e.g., an injection molding station) of an assembly area. The molding plates are custom formed for molding ear tips in accordance with the invention. The top and bottom molding plates can form a first mold. Next, an inner structure can be compression molded 1204 using a first moldable material injected into the first mold. As an example, the first mobile material can be silicone. Once molded, the formed inner structure can be cured 1206. The inner structure can be cured 1206 using radiation, such as heat or UV light, and/or time.

Next, the molding station is reconfigured 1280 by replacing one of the top and bottom molding plates. The new combination of molding plates can form a second mold. For example, the top molding plate utilized in the molding of the inner structure can be removed and replaced with a different top molding plate. In this case, the new top molding plate facilitates creation of an outer structure. Hence, after the molding station has been reconfigured 1208, and outer structure can be compression molded 1210 using a second moldable material injected into the second mold. As an example, the second moldable material can also be silicone. However, in one embodiment, the deformability of the second moldable material is significantly greater than that of the first moldable material. When the outer structure is compression molded 1210 it is integrally formed onto an upper portion of the inner structure. Once molded, the formed outer structure can be cured 1212. The combination of the inner structure and the outer structure results in an ear tip. Since the molding plate typically forms a plurality of structure at one time, the ear tip formation process 1200 can concurrently produce a plurality of ear tips. After the formed outer structure have been cured 1212, the formed ear tips can be removed 1214 from the molding plates. Following the block 1214, the ear tip formation process 1200 can end.

Figure 13:
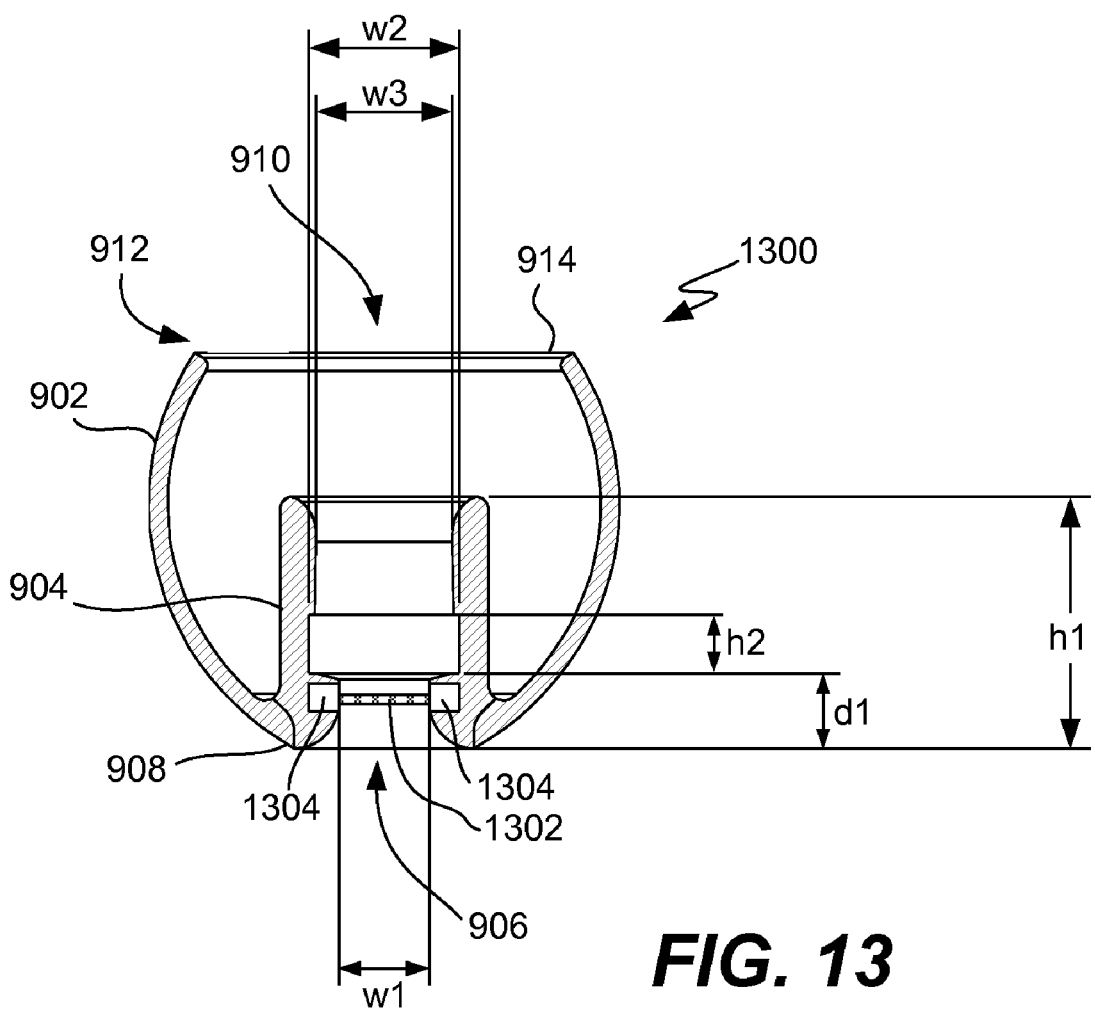
FIG. 13 is a cross-sectional view of the ear tip according to another embodiment of the invention.

In another embodiment an ear tip can include a filter for substantially blocking foreign matter. FIG. 13 is a cross-sectional view of the ear tip 1300 according to another embodiment of the invention. The ear tip 1300 is generally configured the same as the ear tip 900 illustrated in FIG. 9E. Additionally, the inner structure 904 further includes a filter 1302, such as a mesh. The filter 1302 can be supported by a filter support 1304. The filter 1302 can be provided proximate to the front surface 908 of the ear tip 1300. The filter 1302 can, for example, be formed of metal, such as stainless steel, or a polymer, such as nylon. The filter support 1304 can, for example, by a polymer, such as nylon. In one implementation, the filter 1302 and the filter support 1304 can be molded into the inner structure 904. The filter supports 1304 can serve to minimize any injection molding material from attaching to the filter 1302 during the molding process (i.e., injection molding).

The various aspects, features, embodiments or implementations of the invention described above can be used alone or in various combinations.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An earphone, comprising:
an earphone housing having an acoustic channel opening to an acoustic channel;
a removable cap having a threaded portion extending outwardly therefrom, the treaded portion having a plurality of threads on an external surface of the threaded portion, the threaded portion being configured to attach said removable cap to said earphone housing proximate to the acoustic channel opening, said removable cap having an outer mesh cover, wherein the outer mesh cover covers the acoustic channel opening while said removable cap is attached to said earphone housing; and
an ear piece configured to removably attach over at least a portion of said removable cap, said ear piece including at least (i) an inner structure that provides structural support for said ear piece, said inner structure being configured to removably attach to at least one of said removable cap and said earphone housing, and said inner structure having a top end and a bottom end; and (ii) an outer structure integrally formed about said top end of said inner structure, said outer structure being deformable so as to deform during in-ear usage,
wherein said inner structure is formed from an elastomer of a first hardness and said outer structure is formed from an elastomer of a second hardness, and wherein the second hardness is less than the first hardness.

2. An earphone as recited in claim 1, wherein the outer mesh cover is provided proximate to an outer end of the acoustic channel.

3. An earphone as recited in claim 2, wherein the outer mesh serves to substantially block debris from entering the acoustic channel.

4. An earphone as recited in claim 2, wherein said removable cap can be removed by a user to clean debris from the outer mesh.

5. An earphone as recited in claim 2, wherein no tools are required for a user to remove said removable cap to clean debris from the outer mesh.

6. An earphone as recited in claim 2, wherein said earphone further comprises:
an internal mesh across the acoustic channel opening within said earphone housing.

7. An earphone as recited in claim 1, wherein said earphone further comprises:
a gasket disposed at an interface between said removable cap and said earphone housing.

8. An earphone as recited in claim 1, wherein said removable cap includes knurls to facilitate removal of said removable cap from said earphone housing.

9. An earphone as recited in claim 1, wherein the acoustic channel opening includes internal threads, and wherein the plurality of threads on the external surface of the threaded portion of said removable cap include external threads, and wherein the internal threads and the external threads cooperate to attach said removable cap to said earphone housing.

10. An earphone as recited in claim 9, wherein said earphone further comprises:
a gasket disposed at an interface between said removable cap and said earphone housing,
wherein when said removable cap is attached to said earphone housing using the internal threads and the external threads, said gasket is compressed to provide a retention force to further secure said removable cap to said earphone housing.

11. An earphone as recited in claim 1,
wherein the outer mesh cover is provided at an outer end of the acoustic channel, and
wherein said earphone further comprises:
an internal mesh provided within the acoustic channel opening of said earphone housing.

12. An earphone as recited in claim 1, wherein said removable cap and said earphone housing are metal.

13. An earphone as recited in claim 12, wherein the outer mesh cover is metal.

14. An earphone as recited in claim 12, wherein the metal is stainless steel.

15. An earphone as recited in claim 1, wherein said earphone is an in-ear earphone.

16. A headphone, comprising:
a headphone body having an acoustic channel and an acoustic channel opening to the acoustic channel;
a removable cap having a cover, said removable cap being configured to attach to said headphone body adjacent and/or within the acoustic channel opening so that the cover serves to substantially block unwanted debris from entering the acoustic channel while said removable cap is attached to said headphone body;
a mesh provided within the acoustic channel of said earphone housing; and
an ear piece configured to removably attach over at least a portion of said removable cap, said ear piece including at least (i) an inner structure that provides structural support for said ear piece, said inner structure being configured to removably attach to at least one of said removable cap and said headphone body, and said inner structure having a top end and a bottom end; and (ii) an outer structure integrally formed about said top end of said inner structure, said outer structure being deformable so as to deform during in-ear usage,
wherein said inner structure is formed from an elastomer of a first hardness and said outer structure is formed from an elastomer of a second hardness, and wherein the second hardness is less than the first hardness.

17. A headphone as recited in claim 16, wherein the cover is a mesh cover.

18. A headphone as recited in claim 17, wherein no tools are required for a user to remove said removable cap to clean debris from the cover.

19. A headphone as recited in claim 16, wherein said earphone further comprises:
a gasket disposed at an interface between said removable cap and said headphone body.

20. A headphone as recited in claim 16, wherein said headphone is an in-ear headphone.

21. A headphone, comprising:
a headphone body having an acoustic channel and an acoustic channel opening to the acoustic channel;
a removable insert configured to attach to said headphone body proximate to the acoustic channel opening so as to substantially block unwanted debris from entering the acoustic channel while said removable insert is attached to said headphone body, wherein sound can emit from the acoustic channel, even while said removable insert is attached, without substantial interference due to said removable insert, and wherein the removable insert includes knurls to facilitate removal of said removable insert from said headphone body; and an ear piece configured to removably attach over at least a portion of said removable insert, said ear piece including at least (i) an inner structure that provides structural support for said ear piece, said inner structure being configured to attach to the headphone, and said inner structure having a top end and a bottom end; and (ii) an outer structure integrally formed about said top end of said inner structure, said outer structure being deformable so as to deform during in-ear usage, wherein said inner structure is formed from an elastomer of a first hardness and said outer structure is formed from an elastomer of a second hardness, wherein the second hardness is less than the first hardness.

* * * * *